US008902812B1

(12) United States Patent
Johnson

(10) Patent No.: US 8,902,812 B1
(45) Date of Patent: Dec. 2, 2014

(54) SYSTEM AND METHOD FOR PASSIVE OPTICAL NETWORK BACKHAUL

(75) Inventor: Harold W. Johnson, Roach, MO (US)

(73) Assignee: Sprint Spectrum L.P., Overland Park, KS (US)

(*) Notice: Subject to any disclaimer, the term of this patent is extended or adjusted under 35 U.S.C. 154(b) by 2589 days.

(21) Appl. No.: 11/374,912

(22) Filed: Mar. 14, 2006

(51) Int. Cl.
*H04W 4/00* (2009.01)
*H04L 12/28* (2006.01)

(52) U.S. Cl.
USPC ........... 370/328; 370/349; 370/356; 370/389; 370/392; 370/401

(58) Field of Classification Search
USPC ......... 370/328, 356, 318, 351, 401, 338, 340; 398/66, 67, 70, 115; 359/125
See application file for complete search history.

(56) References Cited

U.S. PATENT DOCUMENTS

| | | | | |
|---|---|---|---|---|
| 5,168,498 A * | 12/1992 | Adams et al. | ................. | 370/349 |
| 5,301,056 A * | 4/1994 | O'Neill | ......................... | 398/115 |
| 5,572,349 A * | 11/1996 | Hale et al. | ...................... | 398/100 |
| 5,706,111 A * | 1/1998 | Morales et al. | ................. | 398/72 |
| 5,978,117 A * | 11/1999 | Koonen | ......................... | 398/116 |
| 6,091,953 A * | 7/2000 | Ho et al. | ....................... | 455/433 |
| 6,236,365 B1 * | 5/2001 | LeBlanc et al. | ............... | 342/457 |
| 6,347,096 B1 * | 2/2002 | Profumo et al. | ............. | 370/476 |
| 6,625,449 B1 * | 9/2003 | Naqvi et al. | .................... | 455/428 |
| 6,650,909 B1 * | 11/2003 | Naqvi et al. | .................... | 455/560 |
| 6,674,966 B1 * | 1/2004 | Koonen | .......................... | 398/70 |
| 6,751,216 B2 * | 6/2004 | Johnson et al. | ............... | 370/352 |
| 6,967,938 B1 * | 11/2005 | Kang et al. | .................... | 370/335 |
| 7,046,933 B2 * | 5/2006 | Tomioka | ........................ | 398/63 |
| 7,073,956 B1 * | 7/2006 | Shin et al. | ....................... | 385/89 |
| 7,095,957 B1 * | 8/2006 | Britz et al. | ...................... | 398/70 |
| 7,181,142 B1 * | 2/2007 | Xu et al. | ......................... | 398/66 |
| 7,321,921 B2 * | 1/2008 | Malik | .......................... | 709/206 |
| 7,362,745 B1 * | 4/2008 | Cope et al. | ..................... | 370/352 |
| 7,443,864 B1 * | 10/2008 | Johnson | ........................ | 370/400 |
| 7,483,632 B2 * | 1/2009 | Sung et al. | ...................... | 398/63 |
| 7,519,021 B1 * | 4/2009 | Johnson | ........................ | 370/328 |
| 7,773,555 B1 * | 8/2010 | Johnson | ........................ | 370/328 |
| 2002/0089958 A1 * | 7/2002 | Feder et al. | ................... | 370/338 |
| 2003/0137975 A1 * | 7/2003 | Song et al. | .................... | 370/353 |
| 2004/0052528 A1 * | 3/2004 | Halgren et al. | ................. | 398/75 |
| 2004/0156313 A1 * | 8/2004 | Hofmeister et al. | .......... | 370/229 |
| 2004/0179555 A1 * | 9/2004 | Smith | .......................... | 370/521 |
| 2004/0264683 A1 * | 12/2004 | Bye | .............................. | 379/402 |

(Continued)

OTHER PUBLICATIONS

Axerra Networks, "Technical Overview," Slide 2-64, 2004.

(Continued)

*Primary Examiner* — Marsha D Banks Harold
*Assistant Examiner* — Christopher Wyllie

(57) ABSTRACT

A system is described for providing backhaul over an Ethernet passive optical network (EPON). The backhaul may be backhaul for EV-DO and/or EV-DO Rev. A communications. The system for includes at least one cell site. At least two base transceiver stations are located at the cell site. The base transceiver stations receive radio signals from respective mobile stations. A first one of the base transceiver stations provides a first backhaul signal, and a second one of the base transceiver stations provides a second backhaul signal. The cell site multiplexes these backhaul signals together onto an Ethernet passive optical network. In one embodiment, these signals are provided on different pseudowire connections within a single wavelength lambda on the passive optical network. In another embodiment, the signals are provided on different lambdas of the network.

9 Claims, 7 Drawing Sheets

(56) References Cited

U.S. PATENT DOCUMENTS

| | | | |
|---|---|---|---|
| 2005/0058118 A1* | 3/2005 | Davis et al. | 370/351 |
| 2005/0129030 A1* | 6/2005 | Choi et al. | 370/395.53 |
| 2005/0227695 A1* | 10/2005 | Rasanen et al. | 455/436 |
| 2006/0093359 A1* | 5/2006 | Lee et al. | 398/70 |
| 2006/0215667 A1* | 9/2006 | Lin | 370/401 |
| 2006/0227767 A1* | 10/2006 | Johnson et al. | 370/356 |
| 2007/0041346 A1* | 2/2007 | Bae et al. | 370/331 |
| 2009/0042536 A1* | 2/2009 | Bernard et al. | 455/406 |
| 2009/0052893 A1* | 2/2009 | Beer et al. | 398/42 |

OTHER PUBLICATIONS

PONforum, "The Passive Optical Networks Forum," www.ponforum.org/presentations/page129.html.

Resolute Networks, "Cellular Backhaul," www.resolutenetworks.com/Cellularbackhaul.shtml.

Resolute Networks, "EPON," www.resolutenetworks.com/EPON.shtml.

Hitachi, "PON Comparison," Mar. 18, 2005.

Hitachi, "AMN1500 Optical Access Network GbE-PON System for Enterprise Solutions," www.hitachitelecom.com.

Mori et al., "Ultra High-Speed SONET Fiber-Optic Transmission System," p. 79-84, Hitachi Review vol. 47 (1998), No. 2.

Alloptic., China NetCom, Chengdu Selects Alloptic to. Deliver Fiber-To-The-Home to Urban Residents, 1999-2005 Alloptic.

Nayna Networks, "Switched Ethernet Backhaul Application Brief 12," Mar. 2003, www.rbni.com.

Nayna Networks, "Nayna Networks Delivers Industry's First Multi-Network, Multi-Service Ethernet in the First Mile (EFM) Platform," www.nayna.com.

* cited by examiner

US 8,902,812 B1

SYSTEM AND METHOD FOR PASSIVE OPTICAL NETWORK BACKHAUL

BACKGROUND

The present invention relates to wireless communication. In particular, the invention relates to providing a backhaul facility for wireless communication.

With the ever-increasing reliance on mobile, wireless, communications, wireless service providers face the constant challenge of providing reliable service. Because packet data can not be compressed further than it is currently compressed, packet data service providers must be able to offer service at ever-greater bandwidths. One particularly challenging area for service providers is securing bandwidth for backhaul.

In providing such communications, service providers often rely on T1 lines to carry backhaul for high speed wireless packet data communications, according to a protocol such a EV-DO Revision A, for instance. T1 offers relatively low backhaul delay, on the order of 1 ms for each 125 miles of signal propagation. T1, however, suffers from limited scalability. As additional traffic is carried in a wireless telecommunication network, T1 lines can quickly become overburdened. This is particularly the case in a network that provides packet data services. As more subscribers use their mobile devices to access data services, the backhaul carried in a wireless network increases sharply.

EV-DO (referring to "Evolution-Data Only" or "Evolution-Data Optimized") is one protocol for providing wireless packet data services to mobile devices, with available download rates ranging from up to 2.5 Mb/s with (Rev. 0) to 3.1 Mb/s (Rev. A). EV-DO is described in the specification "CDMA2000 High Rate Packet Data Air Interface" EV-DO may be employed in wireless network together telephonic voice communications.

With the increasing availability to wirelessly access high-data-rate packet data services, and with the increasing number of wireless subscribers, it is desirable to implement a backhaul facility that offers cost-effective scalability while maintaining minimal backhaul delay.

SUMMARY

A system for managing backhaul includes at least one cell site. At least two base transceiver stations are located at the cell site. The base transceiver stations receive radio signals from respective mobile stations. A first one of the base transceiver stations provides a first backhaul signal, and a second one of the base transceiver stations provides a second backhaul signal. The cell site multiplexes these backhaul signals together onto an Ethernet passive optical network. In one embodiment, these signals are provided on different pseudowire connections within a single wavelength lambda on the passive optical network. In another embodiment, the signals are provided on different lambdas of the network.

Through the Ethernet passive optical backhaul network, the base transceiver stations can communicate with separate mobile switching centers, which may be operated by separate telecommunications service providers. A first one of the mobile switching centers can communicate with the first base transceiver station through a first pseudowire circuit over the Ethernet passive optical network, and, a second one of the mobile switching centers can communicate with the second base transceiver station through a second pseudowire circuit over the network.

The cell sites and mobile switching centers on the network may be arranged into a ring and/or daisy chain architecture. In this case, mobile switching centers and/or cell sites act as repeaters for signals not destined for them. For example, the first mobile switching center may receive backhaul signals from both the first and second base transceiver stations. The first mobile switching center processes the first backhaul signal (by connecting it with a public switched telephone network, for example), but simply relays the second backhaul signal toward the second mobile switching center. Communications on the network may be encrypted to prevent interception at unauthorized nodes along the network.

DETAILED DESCRIPTION

I. Overview of a Preferred Embodiment

Figure 1:
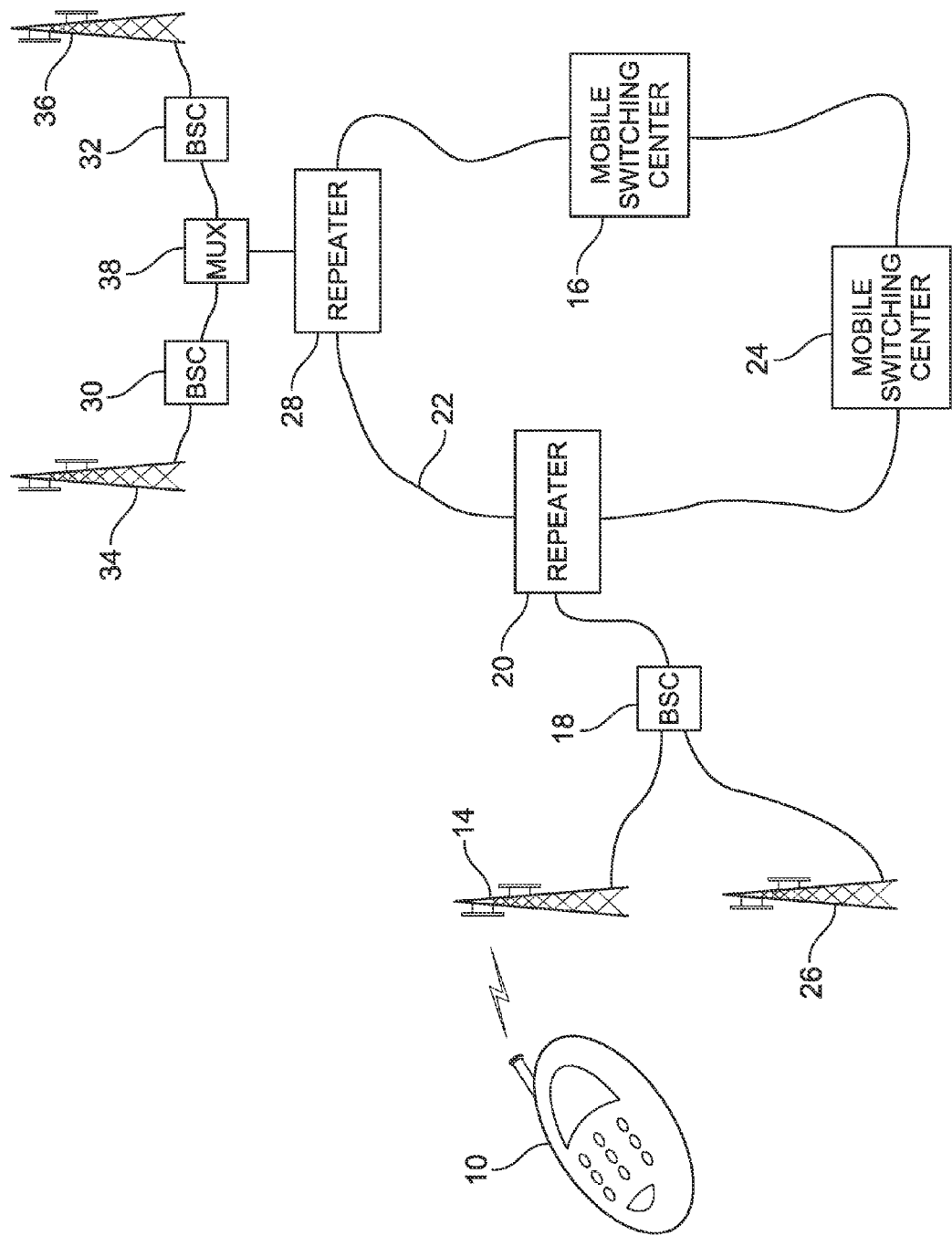
FIG. 1 is a schematic illustration of a wireless telecommunication network including a passive optical backhaul network.

FIG. 1 illustrates a system for providing backhaul to a mobile switching center (MSC) 16. As illustrated in FIG. 1, a mobile device, such as a mobile telephone 10 communicates wirelessly with a base transceiver station (BTS) 14. A base station controller (BSC) 18 that services the base transceiver station 14 forwards signals received from the mobile device 10 to a repeater 20. The repeater 20 is preferably a repeater on an Ethernet Passive Optical Network (EPON). Nodes on the EPON communicate over an optical cable 22, which may include a one or two fiber bi-directional link. Through the repeater 20 and optical cable 22, the Ethernet passive optical network provides backhaul to the mobile switching center 16.

The base station controller 18 may service more than one base transceiver stations, such as station 14 and one or more additional stations 26. The Ethernet passive optical network may further include additional repeaters, such as repeater 28. Repeater 28 receives an input signal from two different base station controllers 30 and 32, which service respective base transceiver stations 34 and 36. Radio signals received by base transceiver stations 34 and 36 are combined by a multiplexer 38 and are supplied to the repeater 28.

As illustrated in FIG. 1, the Ethernet passive optical network may have a loop architecture. Situated around the loop may be other mobile switching centers, such as mobile switching center 24. Where more than one mobile switching center is provided on the Ethernet passive optical network, the different mobile switching centers may be operated by different wireless service providers.

Where more than one base station controller (such as 18, 30, and 32) and more than one mobile switching center (such as 16 and 24) are in communication over the Ethernet passive optical network, different mobile switching centers may handle the backhaul from different base station controllers.

For example, in an embodiment in which the different base station controllers are operated by different wireless service providers, and different mobile switching centers are operated by different wireless service providers, it is preferable for backhaul from each base station controller to be handled by the mobile switching center corresponding to its own wireless service provider.

In an embodiment in which the Ethernet passive optical network handles backhaul from multiple service providers, it is desirable to provide security such that a service provider cannot access communications being handled by a different service provider. This may be handled in different ways.

In one embodiment, the Ethernet passive optical network uses wavelength division multiplexing, in which each wavelength (lambda) is dedicated to a different wireless service provider. Each service provider is supplied with a gigabit Ethernet connection over its respective lambda. In such an embodiment, transport bandwidth is shared between cell sites and MSC of only one operator per gigabit Ethernet (lambda) connection. In this way, backhaul traffic from different wireless service providers is combined on the same fiber cable, but each lambda is dedicated to a single wireless service provider. Because there is no traffic sharing of common Ethernet bandwidth and no foreign connections to other networks, the service is dedicated and secure without encryption.

In another embodiment, different service providers share backhaul over the same gigabit Ethernet connection (and over the same lambda). In such an embodiment, transport bandwidth is shared between wireless service provider cell sites and mobile switching centers. In general, this provides less security than using a dedicated lambda for each wireless service provider. However, very good security can be provided by providing separate pseudowire (PWE) backhaul circuits over the shared lambda connection. In this embodiment, backhaul traffic of multiple wireless service providers is shared, but bandwidth is dedicated only to wireless service provider operators with no foreign interconnection to other networks. Wireless service providers may wish to encrypt their traffic to guard against internal network attacks, leading to a minimal delay in backhaul traffic.

A pseudowire circuit provides an emulation tunnel over a packet switched network. Various services may be emulated over a pseudowire circuit, such as a frame relay, ATM (asynchronous transfer mode) circuits, or TDM systems (time division multiplexing). One type of TDM system that may be emulated over a pseudowire circuit is a T1 system.

Using pseudowire circuits over an Ethernet passive optical network, legacy cell site equipment (such as base station controllers and base transceiver stations) can be used to supply T1 signals to a pseudowire multiplexer. The pseudowire multiplexer combines these signals into packets for gigabit Ethernet communications, and the packets are sent over the passive optical network. With the addition of new repeaters in the passive optical network, the backhaul facility is readily scalable to accommodate new base transceiver stations.

With the use of pseudowire circuits multiplexed over an Ethernet passive optical network, different service providers (or different equipment from the same provider) that use different protocols can be accommodated. For example, one service provider may use both EV-DO and T1 for backhaul. Another may make use of EV-DO Rev. A. These different protocols can be multiplexed together into a common lambda. For added security, each wireless service provider may have its own dedicated pseudowire multiplexer.

II. An Exemplary EPON Backhaul System

Figure 2:
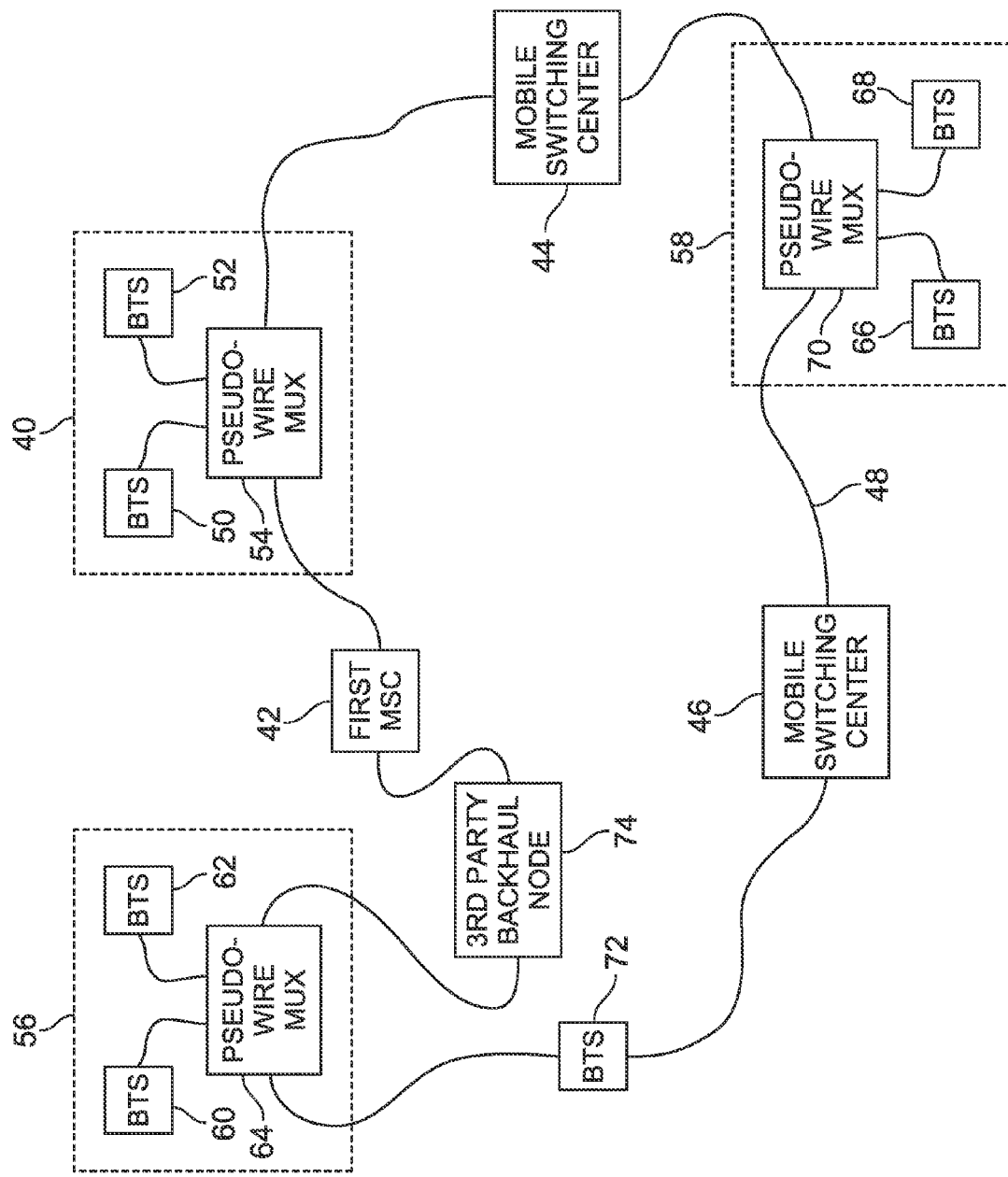
FIG. 2 is a schematic illustration of the architecture of a passive optical backhaul network.

One exemplary optical network backhaul system is illustrated in FIG. 2. In the system, a plurality of cell sites, such as site 40, are in communication with one or more mobile switching centers, such as mobile switching centers 42, 44, and 46. Communications are conducted over an optical cable 48, which preferably is a bi-directional fiber link.

As shown in the example of FIG. 2, cell site 40 is provided with two base transceiver stations 50 and 52. Backhaul from base stations 50 and 52 is provided to the pseudowire multiplexer 54, which multiplexes the backhaul onto optical cable 48. The multiplexers of FIG. 2 may include an electro-optical interface such as that described in U.S. Patent Application Publication 2004/0052528 (Mar. 18, 2004).

Additional cell sites 56 and 58 are also provided in the backhaul system. Cell site 56 includes base transceiver stations 60 and 62 and a multiplexer 64. Cell site 58 includes base transceiver stations 66 and 68 and a multiplexer 70. Additional cell sites, each associated with one or a plurality of base transceiver stations, may likewise be provided in the system. A cell site consisting of a single base transceiver station 72, for example, may be connected on the optical network without the intermediation of a multiplexer.

In one embodiment, different base transceiver stations within the same cell site are associated with different mobile switching centers. For example, backhaul from base transceiver stations 50 and 66 may be directed to one mobile switching center 42, while backhaul from base transceiver stations 52 and 68 is directed to another mobile switching center 46. This may be accomplished with at least two different techniques. In the first technique, making use of wavelength division multiplexing, the multiplexers feed the backhaul from different base transceiver stations onto different lambdas of the optical network. In another embodiment, the multiplexers provide different pseudowire connections for the different base transceiver stations. These different pseudowire connections may be provided on the same lambda.

The optical network backhaul system of FIG. 2 may further include one or more third-party backhaul nodes, such as node 74. Such additional nodes may be used, for example, to handle backhaul of data while mobile switching centers handle voice backhaul.

Figure 3:
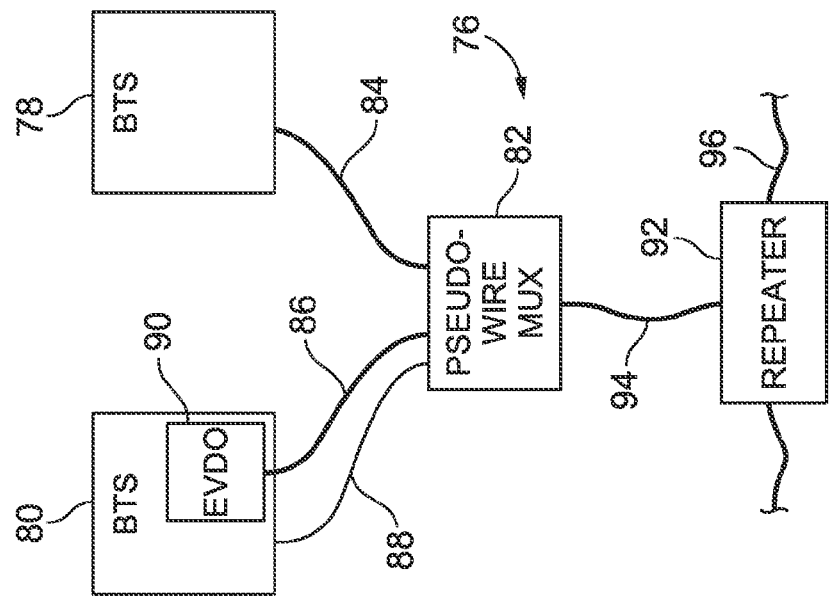
FIG. 3 is a logical architectural diagram of a cell site for use in a passive optical backhaul network.
Figure 4:
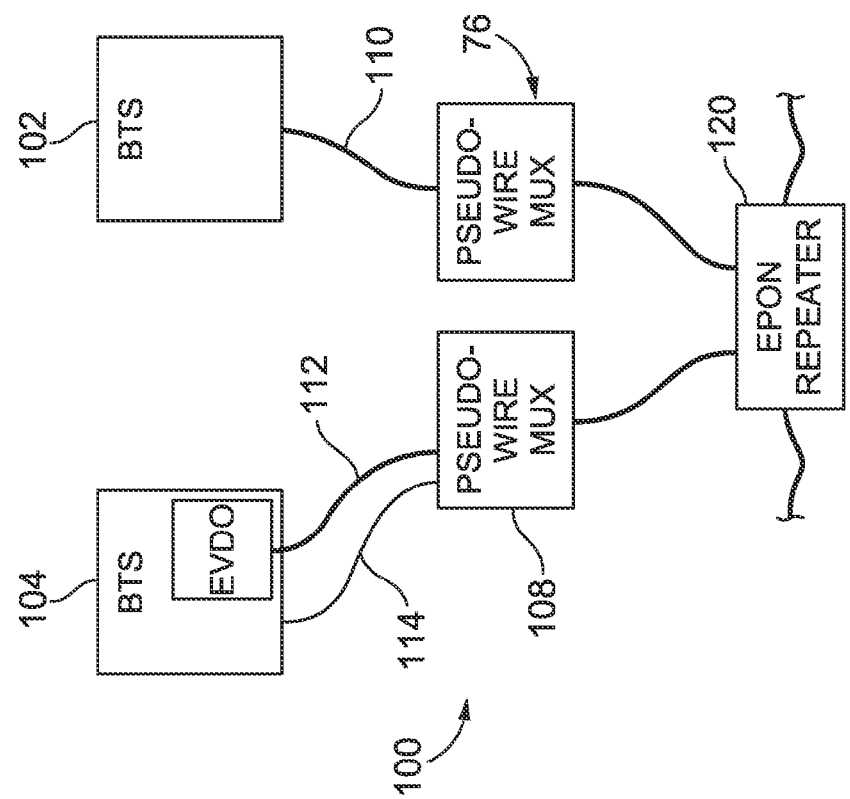
FIG. 4 is a logical architectural diagram of another cell site for use in a passive optical backhaul network.

Exemplary cell sites for use in the backhaul system of FIG. 2 are illustrated in FIGS. 3 and 4.

A cell site 76 as illustrated in FIG. 3 is preferably used in embodiments where backhaul from different base transceiver stations is multiplexed into a single lambda. The cell site 76 includes two base transceiver stations, 78 and 80, and a pseudowire multiplexer 82. The base transceiver stations 70 and 80 respectively communicate their backhaul to the pseudowire multiplexer 82 over 10 Mbps Ethernet backhaul links 84 and 86. As an alternative, or in addition, one or more of the backhaul links is provided over a T1 connection (88). In this example, base transceiver station 80 includes logic 90 for providing EV-DO and/or EV-DO Rev. A communications services, and the 10 Mbps backhaul link 86 provides the backhaul for the EV-DO and/or EV-DO Rev. A services.

The cell site 76 further includes a repeater 92, which may be an optical-electrical-optical (OEO) repeater. The pseudowire multiplexer combines backhaul communications from both base transceiver stations 78 and 80 as separate pseudowire circuits on a single, shared gigabit Ethernet connection 94. The repeater 92 then transmits the combined gigabit Ethernet signal on a single lambda over the optical cable 96.

An alternative cell site 100 is illustrated in FIG. 4. It should be noted that the cell site 100 of FIG. 4 and the site 76 as illustrated in FIG. 3 may both be used together in the same optical backhaul network. The cell site 100 is preferably used in embodiments in which backhaul from different base transceiver stations is provided on different lambdas of the optical network.

The cell site 100 includes two base transceiver stations, 102 and 104, and two respective pseudowire multiplexers 106 and 108. The base transceiver station 102 communicates its backhaul over a 20 Mbps backhaul link to the multiplexer 106. The multiplexer 106 feed the backhaul from base transceiver station 102 onto a gigabit Ethernet link 118. The base transceiver station 104 is provided with EV-DO logic, the backhaul from which is provided to the multiplexer 108 via a 10 Mbps Ethernet backhaul link 112. The base transceiver station 104 further provides voice backhaul over a T1 connection 114 to the multiplexer 108. In this way, voice backhaul over T1 and EV-DO backhaul over 10 Mbps Ethernet can be combined in separate pseudowire circuits on a gigabit Ethernet backhaul link 116. Backhaul from the gigabit Ethernet links 116 and 118 can then be provided to the OEO repeater 120, which uses frequency division multiplexing to combine the backhaul from links 116 and 118 onto different lambdas of the optical network.

In an alternative embodiment, one or more of the cell sites in the backhaul network may be accompanied by or replaced with an aggregation point that collects backhaul from base transceiver stations and/or cell sites at different locations.

The various mobile switching centers 42, 44, and 46, and any third party backhaul node 74 communicate with corresponding base transceiver stations over the optical network. For example, where communications associated with a particular service provider are assigned to a particular corresponding lambda on the optical network, the mobile switching center associated with that provider communicates using that particular lambda. Where communications associated with the service provider are on a particular pseudowire link, the mobile switching center communicates over that pseudowire link, even where the lambda on which the pseudowire link is established may be shared among other service providers.

As to communications reaching a mobile switching center that are not destined for that mobile switching center, the mobile switching center may itself operate as an OEO repeater. For example, if backhaul from base transceiver station 60 (FIG. 2) is destined for the mobile switching center 44, then base transceiver station 72, the mobile switching center 46 (of a different service provider), and the cell site 58 all relay the backhaul from base transceiver station 60 to mobile switching center 44. As the backhaul is preferably encrypted, the relaying nodes cannot access the content of that backhaul.

The use of repeaters at cell sites and mobile switching centers allows the use of a daisy-chain and/or ring architecture, which can simplify the provision of additional nodes in the backhaul network. Where a ring architecture is used, cell cites can be given a redundant physical link with mobile switching centers, enhancing reliability in case of physical disruptions. As additional cell sites are added to the backhaul network, or as additional base transceiver stations are added at these cell sites, the bandwidth allocations within an Ethernet passive optical backhaul network can be adjusted. Furthermore, the use of the Ethernet protocol allows signaling to be shared on a fiber without requiring routers or switches.

Figure 7:
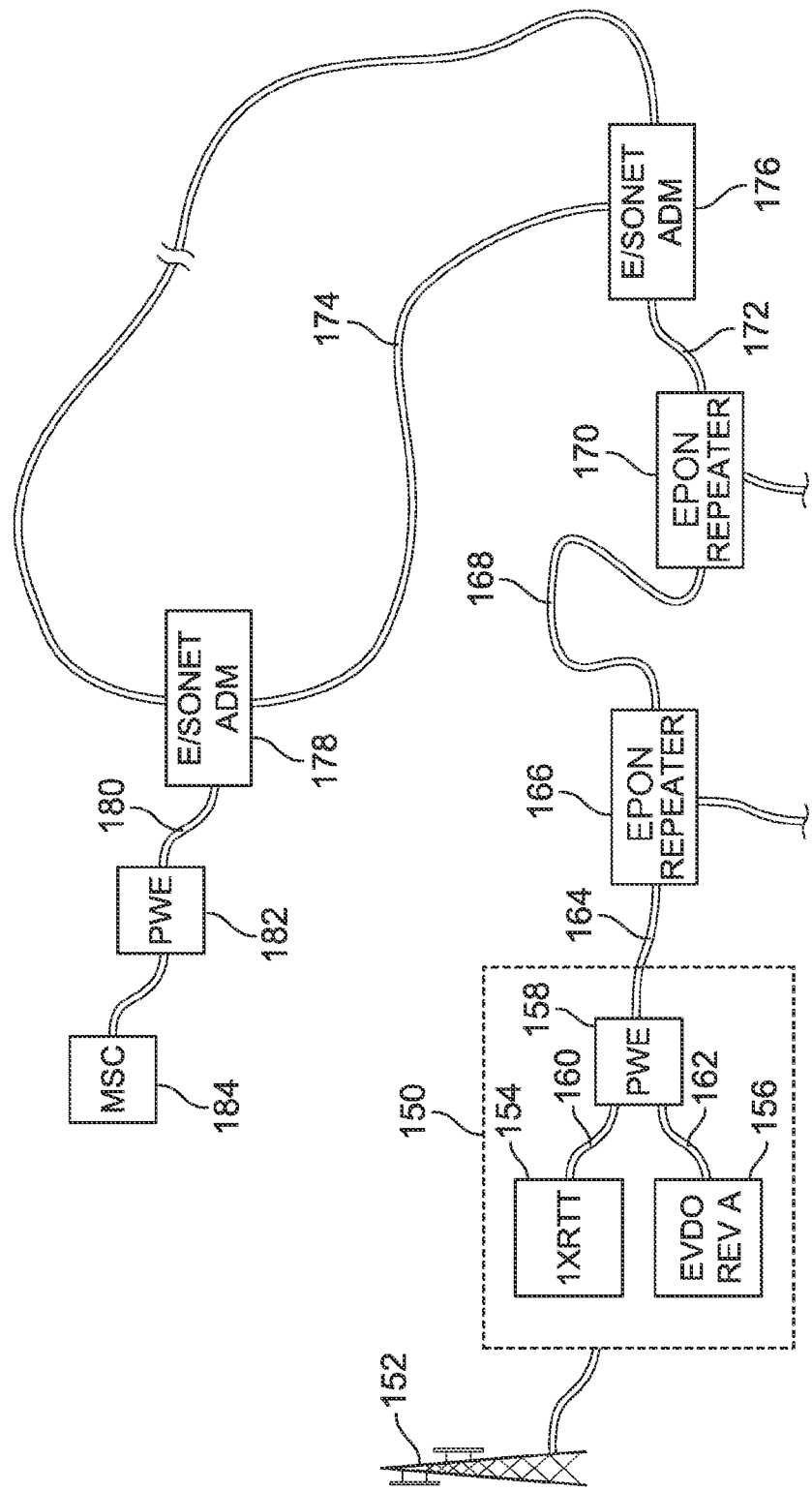
FIG. 7 is a schematic illustration of the architecture of a passive optical backhaul network that makes use of a synchronous optical network.

Another exemplary backhaul system is illustrated in FIG. 7. The example of FIG. 7 is similar to the example of FIG. 3, except that a synchronous optical network (SONET) is provided in addition to the Ethernet passive optical network. In FIG. 7, a cell site 150 is provided with a base transceiver station 152. The cell site 150 includes logic for communicating over 1XRTT (logic 154) and EV-DO Rev. A (logic 156).

The cell site 150 is further provided with a pseudowire multiplexer (PWE) 158. The pseudowire multiplexer receives 1XRTT backhaul communications over a T1 line 160 and receives EV-DO backhaul communications over a 10 BT Ethernet connection. The pseudowire multiplexer combines the backhaul signals onto a fast Ethernet (FE) connection and supplies them to an Ethernet passive optical network repeater 166.

From the repeater 166, the multiplexed backhaul is delivered over a passive optical network cable 168. At another passive optical network repeater 170, the backhaul is demultiplexed from the passive optical network and supplied over a fast Ethernet connection 172 to an E/SONET (synchronous optical network) ring transport network 174. An add/drop multiplexer (ADM) 176 multiplexes the backhaul onto the SONET ring.

Another E/SONET add/drop multiplexer 178 recovers the backhaul signal by demultiplexing it from the synchronous optical network. The backhaul signal 180 is provided over a fast Ethernet connection 180 to a pseudowire demultiplexer 182, which recovers the pseudowire circuits containing the 1XRTT and EV-DO backhaul signals. The demultiplexer 182 in turn provides these backhaul signals to a mobile switching center 184. The 1XRTT signals may be provided to the mobile switching center over a T1 connection, while the EV-DO signals may be provided on a 10BT Ethernet connection.

The embodiment of FIG. 7 allows an Ethernet passive optical network to be used as a loop connecting multiple cell sites, while leveraging the transport capabilities of an existing synchronous optical network. The use of pseudowire circuits allows end-to-end transmission of backhaul over different networks such as EPON or SONET while maintaining the level of service of the native backhaul protocol.

In the embodiment of FIG. 7, as in other illustrated embodiments, additional cell sites and repeaters (not illustrated) may be provided on the passive optical network. These additional cell sites may be associated with the same telecommunications service provider as cell site 150, or they may be associated with one or more different service providers. Similarly, additional mobile switching centers may be provided on the SONET 174. These additional mobile switching centers may associated with either the same or different telecommunications service provider as that associated with the mobile switching center 184.

III. An Exemplary Backhaul Method

Figure 5:
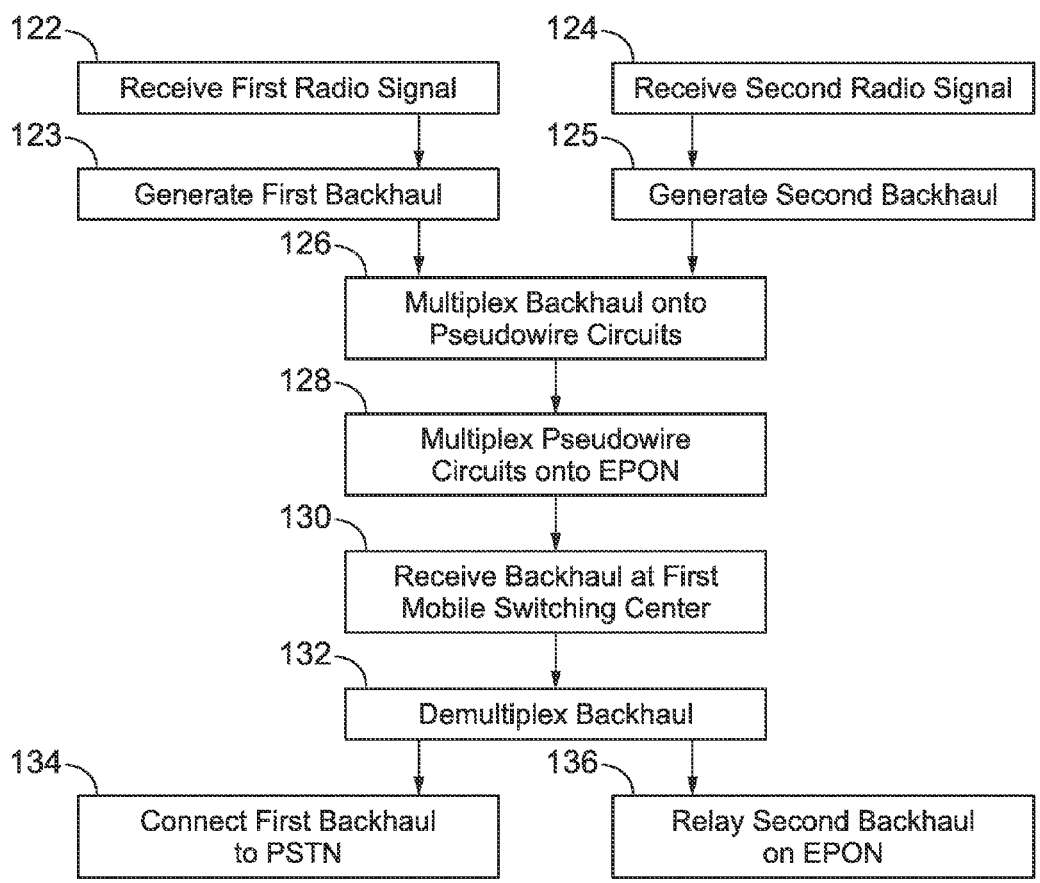
FIG. 5 is a flow diagram illustrating a method for use in a passive optical backhaul network.

A backhaul method, capable of being used with the systems of FIGS. 1-4, is illustrated in FIG. 5. The method of FIG. 5 may be used where a cell site includes base transceiver stations from different service providers, and where those service providers share a common lambda in the backhaul network.

In step 122, the system receives a radio signal from a first mobile node (such as a mobile telephone 10). The first radio signal is received at a first base transceiver station, which generates a backhaul signal in step 123. In step 124, the system receives a radio signal from a second mobile node at a second base transceiver station, which generates a backhaul signal in step 125. The backhaul signals generated at the first and second base transceiver stations include communications from, respectively, the first and second mobile nodes, but may also include communications from additional mobile nodes. Additional base transceiver stations may also be present within the cell site and generate additional backhaul.

In step 126, the system multiplexes the backhaul from the two or more base transceiver stations into separate pseudowire circuits on a gigabit Ethernet link. In step 128, the combined signal is multiplexed onto an Ethernet passive optical network. Backhaul signals from both base transceiver stations are then present on the same lambda of the Ethernet passive optical network, but on separate pseudowire connections.

The combined backhaul signals are received at a mobile switching center in step 130. In the illustrated example, this mobile switching center is operated by the telecommunications service provider that operates the first base transceiver station. The mobile switching center demultiplexes the first and second backhaul signals in step 132. In the embodiment of FIG. 5, the signals are demultiplexed from a single lambda using a pseudowire demultiplexer. (In alternative embodiments, such as that of FIG. 6, the backhaul signals are demultiplexed using a wavelength division demultiplexer from different lambdas.) Because this mobile switching center is associated with the first base transceiver station, it connects the backhaul from the first base transceiver station to the public switched telephone network (PSTN) or other telecommunications network in step 134. As to the backhaul from the second base transceiver station, the mobile switching center relays these communications over the Ethernet passive optical network in step 136.

Figure 6:
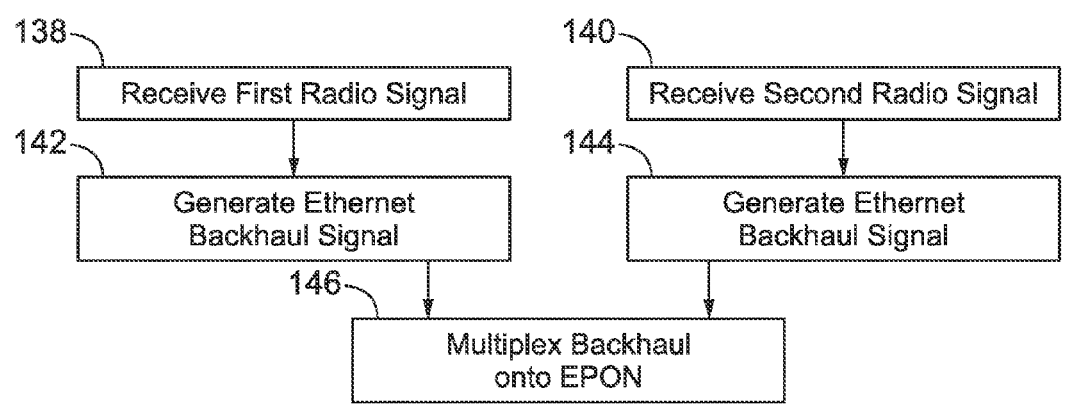
FIG. 6 is a flow diagram illustrating another method for use in a passive optical backhaul network.

Another backhaul method capable of being used with the systems of FIGS. 1-4, is illustrated in FIG. 6. The method of FIG. 6 may be used where a cell site includes base transceiver stations from different service providers, and where those service providers use different lambdas in the backhaul network. Although the method is illustrated with respect to the use of only two base transceiver stations, additional base transceiver stations may also be present and employed in the method.

In step 138, a first base transceiver station receives a radio signal from a first mobile node. In step 140, a second base transceiver station (associated with a different service provider than the first station) receives a radio signal from a second mobile node. In steps 142 and 144 the first and second base transceiver stations respectively generate first and second backhaul in Ethernet format. Using wavelength division multiplexing, these Ethernet signals are multiplexed onto separate lambdas of the Ethernet passive optical network in step 146.

In an alternate implementation of the method of FIG. 6, the multiplexing of step 146 may be performed with a pseudowire multiplexer, and the pseudowire circuits corresponding to Ethernet signals from the different base transceiver stations are provided on either the same or different lambda of the Ethernet passive optical network.

The method illustrated in FIG. 6 may be continued with step 130 of FIG. 5. That is, after the different backhauls are multiplexed on the Ethernet passive optical network (FIG. 6, step 146), the backhaul signals may be relayed and/or processed by mobile switching centers as appropriate, as in steps 132-136.

The foregoing embodiments are provided as examples of the system and method of the invention, and the invention is not to be taken as limited to those examples. Instead, the invention is defined by the following claims.

The invention claimed is:

1. A backhaul method comprising:
   receiving a first radio signal at a first base transceiver station;
   receiving a second radio signal at a second base transceiver station;
   generating a first backhaul signal from the first radio signal;
   generating a second backhaul signal from the second radio signal;
   multiplexing the first and second backhaul signals into respective first and second pseudowire connections on an Ethernet passive optical network, wherein the first base transceiver station communicates with a first mobile switching center over the first pseudowire connection, and the second base transceiver station communicates with a second mobile switching center over the second pseudowire connection;
   receiving the first backhaul signal and the second backhaul signal at a first mobile switching center;
   relaying the second backhaul signal from the first mobile switching center to the second mobile switching center; and
   receiving the relayed second backhaul signal at the second mobile switching center;
   wherein the first base transceiver station and the first mobile switching center are operated by a first service provider; and
   wherein the second base transceiver station and the second mobile switching center are operated by a second service provider different from the first service provider.

2. The method of claim 1, wherein multiplexing includes providing the first and second backhaul signals on separate lambdas of the Ethernet passive optical network.

3. The method of claim 1, wherein the first and second pseudowire connections are sent over the same lambda of the Ethernet passive optical network.

4. A backhaul method comprising:
   receiving a first radio signal at a first base transceiver station;
   generating a first backhaul signal from the first radio signal;
   sending the first backhaul signal on a first pseudowire connection on a passive optical network;
   receiving a second radio signal at a second base transceiver station different from the first base transceiver station;
   generating a second backhaul signal from the second radio signal;
   sending the second backhaul signal on a second pseudowire connection on the passive optical network;
   receiving and processing the first backhaul signal at a first mobile switching center;
   receiving the second backhaul signal at the first mobile switching center, and forwarding the second backhaul signal to a second mobile switching center; and
   receiving and processing the forwarded second backhaul signal at the second mobile switching center;
   wherein the first base transceiver station and the first mobile switching center are operated by a first service provider; and
   wherein the second base transceiver station and the second mobile switching center are operated by a second service provider different from the first service provider.

5. The method of claim 4, wherein the first and second base transceiver stations are provided at a single cell site, and wherein sending the first and second backhaul signals includes:
   multiplexing the first and second backhaul signals onto separate pseudowire circuits; and
   providing the separate pseudowire circuits over a single lambda of the passive optical network.

6. The method of claim 5, wherein the passive optical network is an Ethernet passive optical network.

7. The method of claim 4, wherein the first and second base transceiver stations are provided at a single cell site, and wherein sending the first and second backhaul signals includes:
   providing the first backhaul signal on a first lambda of the passive optical network; and
   providing the second backhaul signal on a second lambda of the passive optical network, wherein the second lambda is different from the first lambda.

8. The method of claim 4, wherein the passive optical network is an Ethernet passive optical network.

9. The method of claim 4, wherein the first and second base transceiver stations are at different locations, and wherein sending the first and second backhaul signals is performed at an aggregation point.

\* \* \* \* \*